US007168009B2

(12) United States Patent  
Darringer et al.

(10) Patent No.: US 7,168,009 B2  
(45) Date of Patent: Jan. 23, 2007

(54) METHOD AND SYSTEM FOR IDENTIFYING ERRORS IN COMPUTER SOFTWARE

(75) Inventors: John A. Darringer, Mahopac, NY (US); Daniel Brand, Millwood, NY (US); Florian Krohm, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 10/669,306

(22) Filed: Sep. 24, 2003

(65) Prior Publication Data

US 2005/0066234 A1    Mar. 24, 2005

(51) Int. Cl.  
*G06F 11/00* (2006.01)

(52) U.S. Cl. .......................... 714/38; 714/35; 714/37; 717/124; 717/126

(58) Field of Classification Search ................ 714/35, 714/37, 38; 717/124, 126  
See application file for complete search history.

(56) References Cited

U.S. PATENT DOCUMENTS 5,319,645 A * 6/1994 Bassi et al. .................. 714/38  
5,903,759 A * 5/1999 Sun et al. ................... 717/128  
6,115,544 A * 9/2000 Mueller ...................... 714/57  
6,901,581 B1 * 5/2005 Schneider ................... 717/124  
6,950,964 B1 * 9/2005 McMichael et al. .......... 714/38

OTHER PUBLICATIONS

Daniel Brand, "A Software Falsifier", *International Symposium on Software Reliability Engineering*, pp. 174-185, Jun. 28, 2000.  
C. Flanagan, et al., "Predicate Abstraction for Software Verification", *Proceedings of the 29th ACM SIGPLA-SIGACT Symposium on Principles of Programming Languages*, vol. 37, Issue 1, Jan. 2002.

* cited by examiner

*Primary Examiner*—Robert W. Beausoliel  
*Assistant Examiner*—Emerson Puente  
(74) *Attorney, Agent, or Firm*—Scully, Scott, Murphy & Presser, P.C.; Rafael Perez-Pineiro, Esq.

(57) ABSTRACT

Disclosed are a method and system for analyzing a computer program. The method comprises the steps of analyzing the program to generate an initial error report and a list of suspected error conditions, and generating a set of assertions and inserting the assertions into the program to determine if the suspected error conditions are valid. Preferably, a strong static analysis method is used to identify an initial set of error reports. When this analysis fails to determine if the condition is true or false, the condition along with the potential program error is captured to form a suspected error. Suspected errors are directed to an assertion generator to produce a monitor—that is, source code modification that is integrated with the original program. This and other inserted monitors check the conditions for the suspected error during the program execution.

19 Claims, 4 Drawing Sheets

FIG. 6

Example Program 1 — 42

```
int P (int);
int Foo (int A)
{
  int X, Y;
  if (P(A)) X = 0;
  if (P(A)) { X = A; Y = A; }
  else { L1: return A/X; }
  L2: return A/(x - Y) ;
}
```

FIG. 7

Example Program 2 — 52

```
int Foo (int A)
{
  int X, Y;
  int Temp1, Temp2;
  if (Temp1 = P(A)) X = 0;
  if (Temp2 = P(A)) { X = A; Y = A; }
  else
    {
      if ( Temp1) printf ("division by 0\n");
      if (!Temp1) printf ("uninitialized X\n");
      L1: return A/X;
    }
  if (Temp2) printf ("division by 0\n");
  L1: return A/(X - Y);
```

METHOD AND SYSTEM FOR IDENTIFYING ERRORS IN COMPUTER SOFTWARE

BACKGROUND OF THE INVENTION

1. Field of the Invention

This invention relates to analyzing errors in computer programs. More specifically, the invention relates to identifying errors in computer programs and to specifying test cases that will cause the errors to occur.

2. Background Art

There are several known methods for identifying errors in software programs. The most common of these methods is testing; that is, executing the target program under different conditions in order to confirm its correct behavior. Another group of methods, program verifiers, attempt to prove mathematically that a program's behavior is correct for all possible input conditions. In addition, there are static analysis tools that perform a set of limited checks without executing the program. These tools report some possible errors.

There are numerous testing tools for exposing errors in a software program. With these tools, the user is provided with an environment for specifying program values, for executing the program in steps, and for examining the resulting program values.

A program verifier attempts to prove that a formal assertion of correct behavior is true for all possible inputs and for all possible execution paths. If the proof is successful, there are no errors represented by the assertion in this portion of the program. If the assertion is proved false, a set of conditions is identified that specify the program's erroneous behavior. Program verifiers are discussed, for instance, in "Predicate Abstraction For Software Verification," by Cormac Flanagan and Shaz Qadeer, Proceedings of the $29^{th}$ ACM SIGPLA-SIGACT symposium on Principles of programming languages, Vol. 37, Issue 1, Jan. 2002.

Another class of tools, referred to as Weak Status Analysis tools, use syntactic and data-flow analysis techniques found in compilers to identify possible program errors. These techniques do identify some program errors, but do not consider the Boolean conditions controlling a program execution and therefore also produce some false error reports.

Other static analysis tools, referred to as Strong Static Analysis tools, use additional theorem proving and symbolic execution techniques to reduce the number of false error reports and to specify the program conditions that lead to an erroneous program execution. One known Strong Static Analysis tool is the Beam analysis tool. The Beam analysis tool is discussed in "A Software Falsifier," by Daniel Brand, International symposium on Software Reliability Engineering, pp. 174–185, October 2000.

While there is a wide range of existing tools to identify program errors, each approach has its limitations.

More specifically, while testing is the most common method for finding errors, it is known that the effectiveness of testing is limited by a user's ability to create new test cases that explore a program's different behaviors. It is normally not feasible to test all possible program executions and is extremely difficult to know what area of a program's execution to explore.

Verifiers require precise and detailed specifications of the target program's correct behavior as well as the surrounding environment of the program execution. Still, it is often the case that an assertion about a program's correctness cannot be shown to be either true or false. This may be due to the limitations of the verifier or of the specification. User assistance is usually needed to guide and to attempt to complete the proof.

Weak Static Analysis tools usually require no additional user input or specifications, but typically produce a large number of false error reports. This is because these tools do not analyze the Boolean conditions that determine a program's control flow, and therefore usually are uncertain if the error will actually occur in the program's actual execution. The user must sort through the false errors to find the real errors reported.

The additional theorem proving and symbolic execution techniques used in Strong Static Analysis tools, such as the Beam tool, do reduce the number of false error reports. However, no method can resolve all conditions in a program and false error reports are still a possibility. For instance, when the Beam analysis tool cannot determine if a particular error will occur in actual program execution, this tool chooses not to report the potential error. This conservative policy has the effect of greatly reducing the number of false error reports, but at the expense of ignoring some potential errors.

SUMMARY OF THE INVENTION

An object of this invention is an improved method and system for identifying errors in computer programs.

Another object of the invention is to use the strengths of existing methods to produce a new and effective method for exposing errors in computer programs that would not likely be found using any one existing method.

These and other objectives are attained with a method and system for analyzing a computer program. The method comprises the steps of analyzing a computer program to generate an initial error report and a list of suspected error conditions, and generating a set of assertions and inserting the assertions into the computer program to determine if the suspected error conditions are valid.

With the preferred embodiment of the invention, described in detail below, a strong static analysis method that analyzes the Boolean conditions determining a program's execution, such as the Beam analysis tool, is used to identify an initial set of error reports for a target program. When the strong static analysis fails to determine if the condition is true or false, the condition along with the potential program error is captured to form a suspected error.

With prior art systems, normally these suspected errors would not be reported, to avoid false error reports. In contrast, in the preferred embodiment of this invention, these suspected errors are directed to an assertion generator to produce a monitor—that is, source code modification that is integrated with the original program. This and other inserted monitors check the conditions for the suspected error during the program execution and report the error if the conditions are valid.

BRIEF DESCRIPTION OF THE DRAWINGS

The foregoing and other objects, aspects, and advantages of the invention will be better understood from the following non-limiting detailed description of preferred embodiments of the invention, given with reference to the drawings that include the following:

FIG. 6 is an example input produced by the invention.

FIG. 7 shows a modified program that includes monitors for the three potential errors in the program of FIG. 6.

DETAILED DESCRIPTION OF THE PREFERRED EMBODIMENTS

This invention, generally, provides an improved method and system for identifying errors in programs by using the strengths of existing methods.

Figure 1:
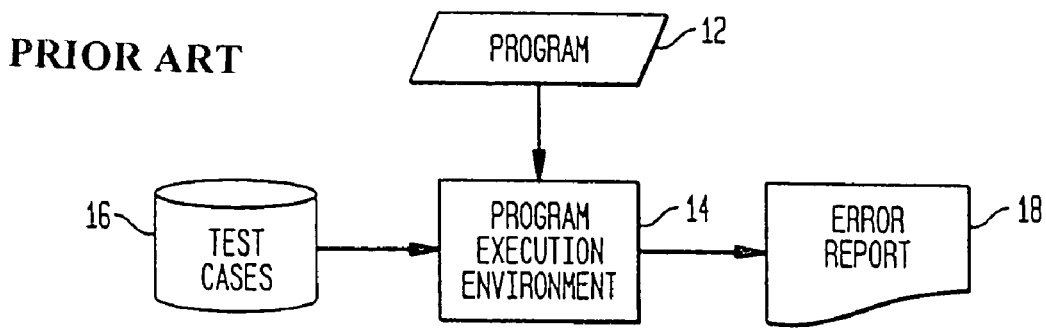
FIG. 1 is a block diagram describing the current environment for testing programs with test cases to produce an error report.

FIG. 1 illustrates a typical program testing process. A program 12 is entered into a program execution environment 14 along with a set of test cases 16. Test cases 16 can be provided by an external file or interactively by the person doing the testing. Each test case provides values for selected program variables and an expected behavior for the program. The program is executed and an error report 18 is generated confirming correct program behavior or indicating that an error has occurred.

Figure 2:
FIG. 2 is a block diagram describing the current weak static analysis process, which yields an error report.

FIG. 2 is a block diagram describing the current weak static analysis process. A program source code 22 is input to the weak static analysis process 24 and an error report 26 is generated that indicates a set of potential errors.

Figure 3:
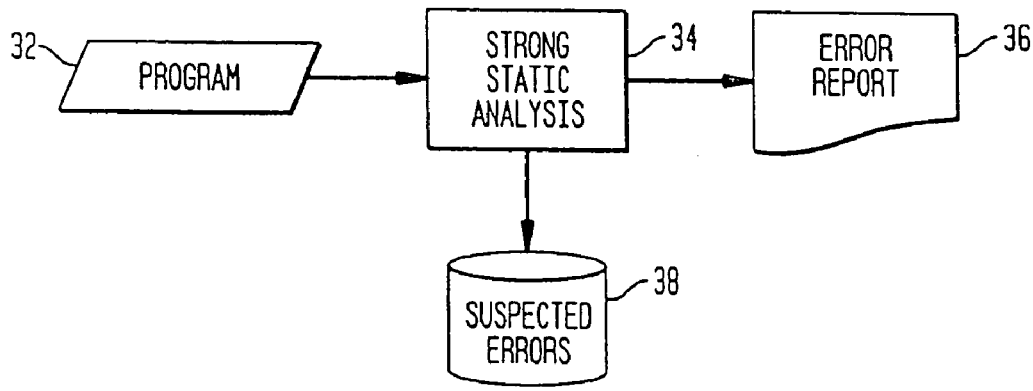
FIG. 3 is a block diagram describing the current strong static analysis process, which yields an error report and a set of potential error conditions.

FIG. 3 shows a program source code 32 as input to the strong static analysis process 34 and the resulting error report 36. In addition, the strong static analysis process has been modified to produce a list of suspected errors 38 that have uncertain feasibility, due to the limitations of the analysis of the Boolean conditions that determine if the error would actually occur in normal program execution. The suspected error list is a list of errors and the conditions that must be true for the error to occur.

Figure 4:
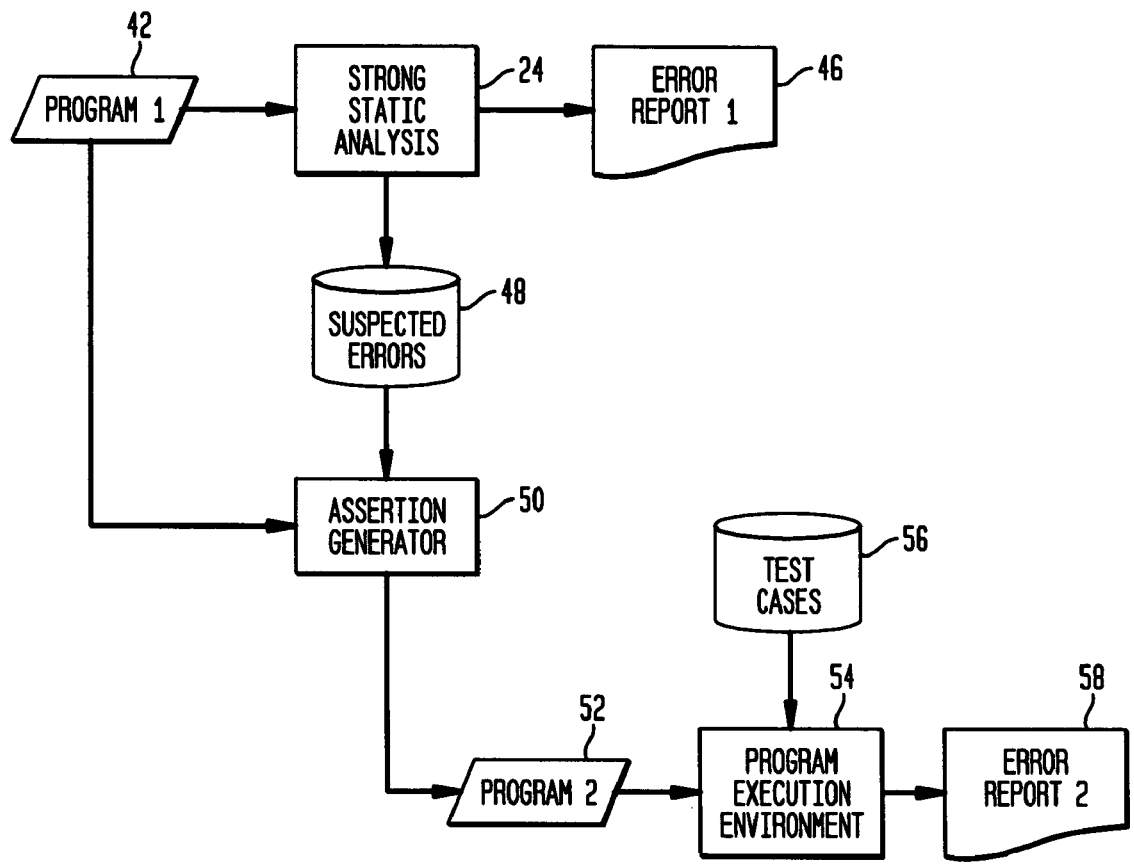
FIG. 4 is a block diagram of the preferred embodiment of the invention.

FIG. 4 describes the preferred embodiment of the invention. A first program 42 is analyzed with strong static analysis 44 to identify one set of errors in error report 46. The strong static analysis also produces a set of suspected errors 48 that are input to an assertion generator 50 that, in turn, produces a set of source code statements or monitors and inserts these monitors into program 42 to form second program 52. As represented at 54, program 52 is then executed normally or with user supplied test cases 56. During the execution of program 52, the conditions for the suspected errors are monitored. If the conditions for one of the suspected errors are satisfied, then the added assertion statements generate a second error report 58 indicating that the error has occurred.

The Assertion Generator 50 can be extended to insert a call to an error handling routine after reporting the error, but before the actual error occurs. This extension could be used in testing for multiple errors in one run.

Optionally, the Assertion Generator 50 could be given the complete list of errors, both the reported errors of Error Report 46 as well as the suspected errors. It would then produce monitoring statements to track conditions for all these errors and report them if they occurred during testing or normal execution. This would provide additional confirmation of the strong static analysis and if error handling is provided, could prevent known errors from interfering with the testing for additional errors.

Figure 5:
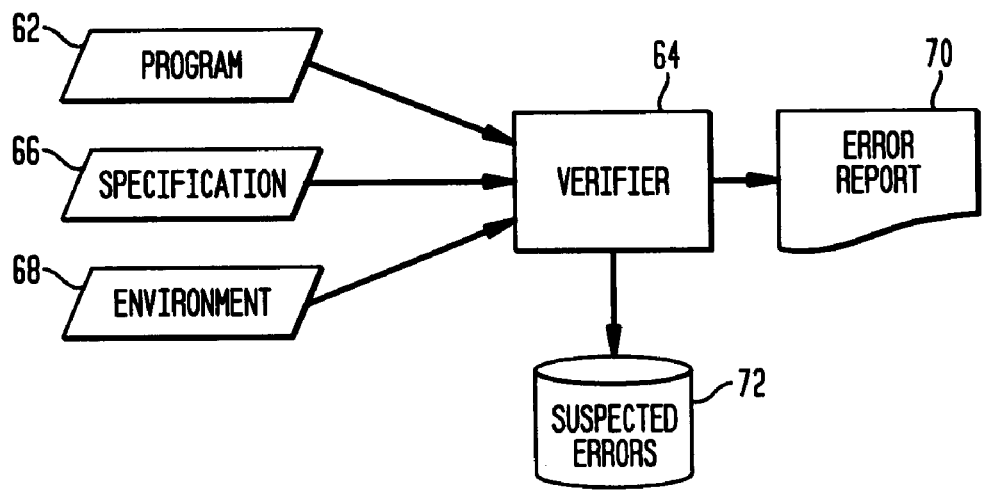
FIG. 5 is a block diagram describing the current verification process, which yields an error report and a set of suspected errors.

FIG. 5 is a block diagram describing a typical verification process that has been modified to generate a list of suspected errors. A program 62 is input into the program verifier 64 along with a specification 66 of the program's correct behavior and a description 68 of the program's execution environment. In addition to producing an error report 70 that confirms correct program behavior or that lists program errors, this verifier 64 also produces a list of suspected errors 72 that it could not confirm or deny through its analysis. Such a modified verifier can be used instead of the strong static analysis process included in the preferred embodiment shown in FIG. 4.

FIG. 6 illustrates an example program 42 that may be input to the process described in FIG. 4. A strong analysis program such as the Beam analysis tool would detect three potential errors:

1. At label L1, X will be used but un-initialized if both P(A) calls return false.
2. At label L2, division by 0 occurs if the second call to P(A) returns true.
3. At label L1, Division by 0 occurs if the first call to P(A) returns true and the second call returns false.

The Beam analysis tool would report the first two errors, but not the third. This analysis tool would assume that it is unlikely that a function P would return different values when called with the same argument and not report a problem, to avoid a false error report. Thus, the third potential error is an example of a suspected error.

The Assertion Generator 50 of FIG. 4 would accept the list of suspected errors and produce a modified program 52 shown in FIG. 7. In this example, all errors including the errors reported in Error Report 76 as well as the suspected errors are passed to the Assertion Generator 50. FIG. 7 shows monitors of the conditions for the three errors and three print statements for reporting each error if it occurs during testing or normal program execution of Program 52. The Assertion Generator 50 can be extended to also call an error handling routine to avoid executing the erroneous statement when it is detected.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A computer program analysis method comprising the steps:

analyzing a computer program to generate an initial error report and a list of conditions for suspected errors; and generating a set of assertions and inserting the assertions into the computer program;

re-executing the computer program, with said assertions therein, while monitoring for the conditions for the suspected errors; and if, during the re-executing step, the conditions for one of the suspected errors are satisfied, then generating a second error report indicating that said one of the suspected errors is a true error.

2. A method according to claim 1, further comprising the steps of:

testing the computer program for any user supplied test cases; and if there are user supplied test cases, determining if the test cases lead the program execution to satisfy the suspected error conditions.

3. A method according to claim 1, wherein the generating step includes the steps of:
   generating an assertion for each of the errors and suspected errors; and
   inserting into the computer program assertions for all of said errors and suspected errors.

4. A method according to claim 1, wherein the step of analyzing the computer program includes the step of attempting to resolve the Boolean conditions that determine the program's control flow and execution.

5. A method according to claim 4, wherein the step of attempting to resolve the Boolean conditions includes the step of using a strong static analysis to analyze the computer program.

6. A method according to claim 1, wherein the step of analyzing the computer program includes the step of using a program verifier to analyze the computer program.

7. A system for analyzing a computer program comprising:
   an analyzer means for analyzing a computer program to generate an initial error report and a list of conditions for suspected errors;
   an assertion generator for generating a set of assertions and inserting the assertions into the computer program; and
   a re-execution for re-executing the computer program, with said assertions therein, while monitoring for the conditions for the suspected errors; and if, during said re-executing, the conditions for one of the suspected errors are satisfied, for then generating a second error report indicating that said one of the suspected errors is a true error.

8. A system according to claim 7, further comprising:
   a tester for testing the computer program for any user supplied test cases; and if there are user supplied test cases, for determining if the test cases lead the program execution to satisfy the suspected error conditions.

9. A system according to claim 8, wherein, if the test cases lead the program execution to satisfy the suspected error conditions, then the assertion generator uses the assertions to determine if the suspected error occurs.

10. A system according to claim 7, wherein the assertion generator generates an assertion for each of the errors and suspected errors, and inserts into the computer program assertions for all of said errors and suspected errors.

11. A system according to claim 7, wherein the analyzer means analyzes the computer program by attempting to resolve the Boolean conditions that determine the program's control flow and execution.

12. A system according to claim 11, wherein the analyzer means uses a strong static analysis to analyze the computer program.

13. A program storage device readable by machine, tangibly embodying a program of instructions executable by the machine to perform method steps for analyzing a computer program, said method steps comprising:
   analyzing a computer program to generate an initial error report and a list of conditions for suspected errors;
   generating a set of assertions and inserting the assertions into the computer program;
   re-executing the computer program, with said assertions therein, while monitoring for the conditions for the suspected errors; and
   if, during the re-executing step, the conditions for one of the suspected errors are satisfied, then generating a second error report indicating that said one of the suspected errors is a true error.

14. A program storage device according to claim 13, wherein said method steps further comprise the steps of:
   testing the computer program for any user supplied test cases; and
   if there are user supplied test cases, determining if the test cases lead the program execution to satisfy the suspected error conditions; and wherein
   the step of inserting the assertions into the computer program includes the step of, if the test cases lead the program execution to satisfy the suspected error conditions, then using the assertions to determine if the suspected error occurs.

15. A program storage device according to claim 13, wherein the generating step includes the steps of:
   generating an assertion for each of the errors and suspected errors; and
   inserting into the compute program assertions for all of said errors and suspected errors.

16. A program storage device according to claim 13, wherein the step of analyzing the computer program includes the step of using a strong static analysis to attempt to resolve the Boolean conditions that determine the program's control flow and execution.

17. A program storage device according to claim 13, wherein the step of analyzing the computer program includes the step of using a program verifier to analyze the computer program.

18. A method according to claim 17, wherein the step of generating a set of insertions includes the steps of:
   i) inputting said list of conditions into an assertion generator, and
   ii) using the assertion generator (i) to produce said assertions and (ii) to insert said assertions into the computer program; and
   the step of generating a second error report includes the step of using said assertions when inserted into the computer program, to generate the second error report.

19. A method according to claim 18, wherein the step of using the assertion generator includes the further step of using the assertion generator to insert into the computer program a call to an error handling routine, said call being inserted into the computer program at a point in the program that is after said second error report is generated and before said one of the suspected errors occurs.

* * * * *